L. S. JONES.
SAW GAGE.
APPLICATION FILED NOV. 2, 1915.
1,281,168.
Patented Oct. 8, 1918.
2 SHEETS—SHEET 1.
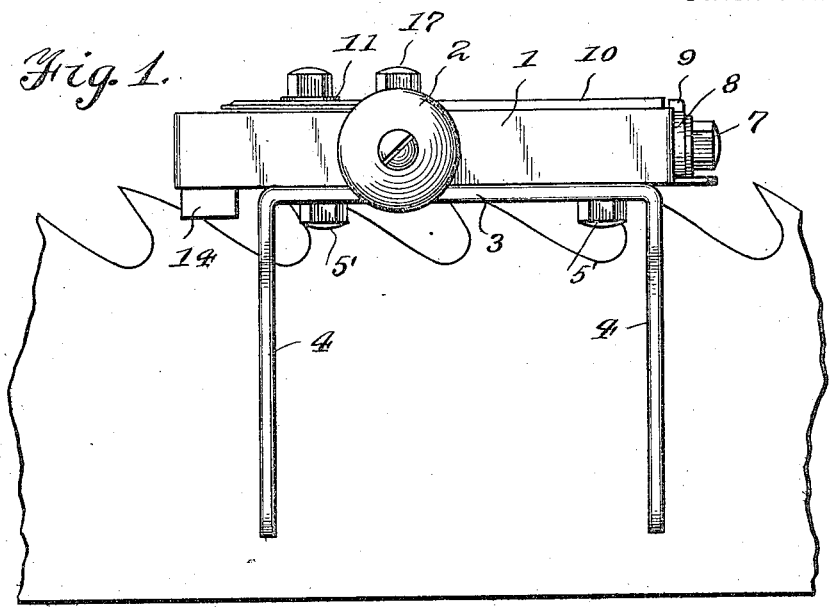
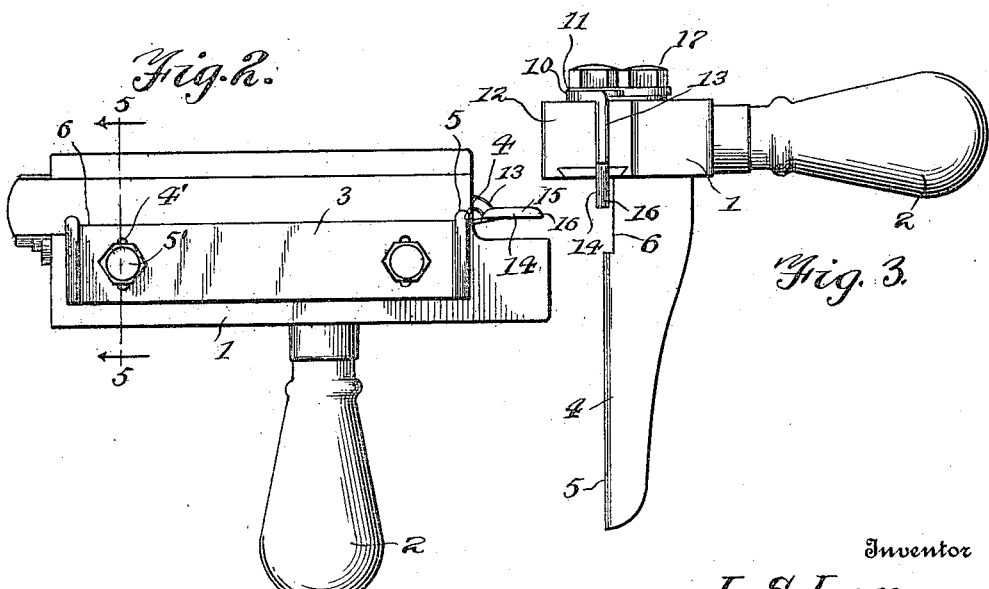
Inventor
L. S. Jones.
By Victor J. Evans
Attorney
Witnesses

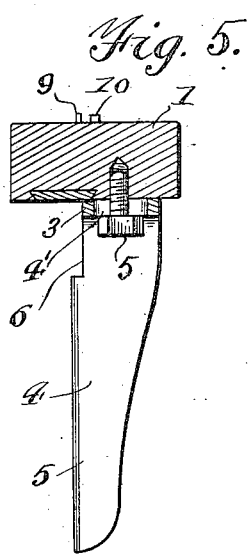
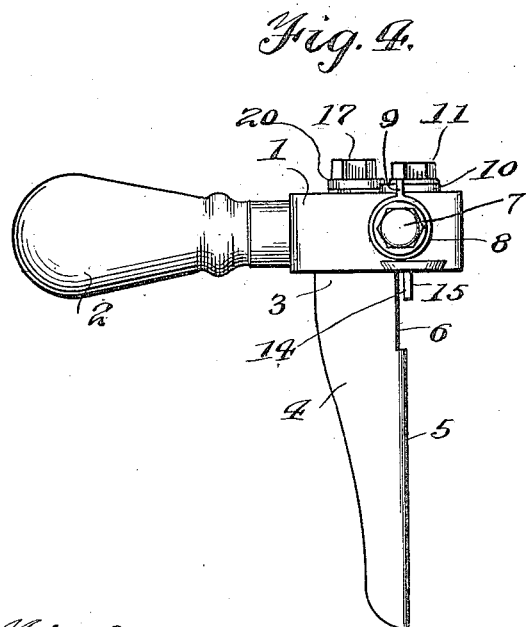
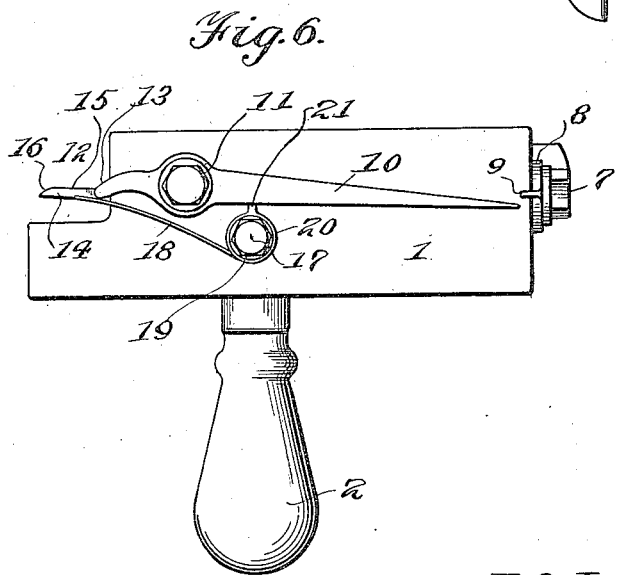

UNITED STATES PATENT OFFICE.

LOUIS S. JONES, OF CRITTENDEN, ARKANSAS.

SAW-GAGE.

1,281,168.  Specification of Letters Patent.  Patented Oct. 8, 1918.

Application filed November 2, 1915. Serial No. 59,256.

*To all whom it may concern:*

Be it known that I, LOUIS S. JONES, a citizen of the United States, residing at Crittenden, in the county of Crittenden and State of Arkansas, have invented new and useful Improvements in Saw-Gages, of which the following is a specification.

This invention relates to saw gages, and has for its primary object the provision of a tool of this character which will be adapted for use in determining the position of certain teeth with relation to adjacent teeth and for readily and accurately determining the irregularities therein over the normal and necessary position of the teeth.

Another object of the invention is the provision of a device of this character which will include co-acting or coöperating indicating elements and a sliding head which may be manually carried over the saw blade so that the said elements may be automatically operated on movement of the head.

A further object of the invention is the provision of a rest which will be adjustable on the head so as to accommodate the teeth in a manner which will bring them into positive contact with the movable indicating member of the tool.

With the above and other objects in view, the improvement resides in the construction, combination and arrangement of parts set forth in the following specification and falling within the scope of the appended claims.

In the drawings:

Figure 1 is a side view of the tool showing its application to a saw blade,

Fig. 2 is a plan view of the device,

Fig. 3 is a view looking toward one end thereof,

Fig. 4 is a view looking toward the opposite end of the device, and

Fig. 5 is a section taken approximately on the line 5—5 of Fig. 2.

Fig. 6 is a top plan view of the device.

The tool element illustrated is intended primarily as a means of determining irregularities in the teeth following the swaging process, and its principal purpose is the provision of means which will positively come in contact with crooked teeth and for permitting such teeth to be accurately distinguished from other and true teeth. It is also aimed to provide a tool of this kind in which an accurate resetting or alining process of the teeth may be maintained with the utmost simplicity and convenience.

In carrying the device into practice it is preferred to employ a hand actuated head 1 having a handle 2 at one side which may be grasped in the hand of the operator to permit the head to be manually moved over the cutting edges of the teeth of a band saw, such as is illustrated in Fig. 1 of the drawings. Beneath the head is a rest 3 of substantially U-shaped formation, carrying vertical legs 4—4 whose vertical edges 5 are rounded so that they may be freely carried over the side of the saw while the tool is in operation. The rest 3 is provided with elongated slots 4' which receive stud bolts 5' threadedly mounted in the head 1. By loosening the bolts the rest 3 may be adjusted along the underside of the head 1 for a purpose to be hereinafter explained. The legs 4 of the rest 3 are provided with clearance recesses 6 for the purpose of permitting crooked or bent teeth to be properly accommodated as the device is moved over the saw.

Upon one end of the head is a stud bolt 7 which accommodates a pointer 8 having an indicating projection 9 which is extended over the head 1 in a position to coöperate with a movable pointer 10. This movable pointer is pivoted at 11 to the head 1 in order that it may be moved into coöperating position with the fixed pointer at the time of gaging the inaccuracies in the teeth. One end of the head is recessed, at 12, to receive the vertical branch 13 of the pointer 10 and said vertical branch carries a foot or shoe 14 having a flat working surface 15 and rounded vertical end surfaces 16—16. Mounted upon the head 1 is a stud 17 which is engaged by a spring 18 having its actuating terminal extended in the direction of the vertical branch of the movable pointer 10 and directly contacting therewith so as to normally hold the indicating end of the pointer 10 out of alinement with the fixed pointer and to simultaneously hold the shoe 14 in position to be engaged by the teeth of the saw.

In order to fix the normal relation of the movable pointer 10 with the adjustable relatively stationary pointer 9, I provide a stud 19 which carries a revolubly adjustable member 20 having a lug 21 disposed in the path of the pointer 10 to serve as a stop therefor. By adjusting the position of the lug 21 so that the end of the pointer 10 will normally aline with the adjustable pointer 9, the pointer 10 may be made responsive to variations from the normal condition of saw teeth.

The adjustment of the rest 3 upon the head 1 provides a means whereby the teeth disposed in normal position can be properly accommodated at the time of the use of the tool. This is clearly understood owing to the fact that adjustment in one direction of the rest 3 will move the vertical legs 4—4 with relation to the wiping or active contacting surface 15 of the shoe or foot piece on the movable pointer 10.

In using the tool the legs 4—4 of the rest 3 are placed against one side of the saw blade, as shown in Fig. 1, the points of the teeth being extended in a direction which will permit of their free passage against the wiping surface 15 of the shoe on the movable pointer. The extreme points on the saw teeth are adapted to come against the underside of the head 1 at the time of moving the latter over the saw blade. It now follows that on moving the tool in the direction of the points the wiping surface 15 of the movable pointer will be thrown into contact with all irregular or crooked teeth and through such arrangement, movement will be imparted to the movable pointer 10 so as to cause the same to properly co-act with the fixed pointer of the structure. An alinement of the fixed pointer of the tool with the movable pointer will indicate proper alinement or normal position of the teeth of the saw, while an unalining relation of the pointers will indicate such inaccuracies of the teeth as require straightening in order to bring the teeth into proper alinement as will be understood.

Having thus described the invention, what I claim is:

1. A saw gage comprising a head movable over the points of saw teeth, an inverted U-shaped rest adjustably mounted on the bottom thereof, a movable pointer pivoted intermediate its ends upon the top of said head and having one end extended vertically downward in position to engage the sides of the teeth of a saw, and a relatively fixed adjustable pointer coöperating with said movable pointer.

2. A saw gage comprising a head engageable with and movable over the points of the teeth of a saw, a rest secured upon said engaging face of said head and movable along the sides of the teeth of a saw, an adjustable relatively fixed pointer secured upon one end of said head, and a movable pointer pivoted upon the opposite side of said head and having one end extended to be disposed against the sides of the saw teeth, the movable end of said movable pointer swinging out of alinement with said relatively fixed pointer during engagement with irregular teeth of the saw.

3. A saw gage comprising a head recessed at one end and movable over the points of the teeth of a saw, a rest mounted on said head and bearing against the sides of the saw teeth, a movable spring pressed pointer pivoted intermediate its ends upon said head and having one end bent at right angles to its body portion and extending through said recess, a shoe on the angularly bent end of said movable pointer engageable with the opposite sides of the teeth of the saw, and a relatively fixed pointer coöperating with the free end of said movable pointer.

In testimony whereof I affix my signature in presence of two witnesses.

LOUIS S. JONES.

Witnesses:
H. A. MORISON,
C. T. WHITMAN.

Copies of this patent may be obtained for five cents each, by addressing the "Commissioner of Patents, Washington, D. C."